Figure 1:
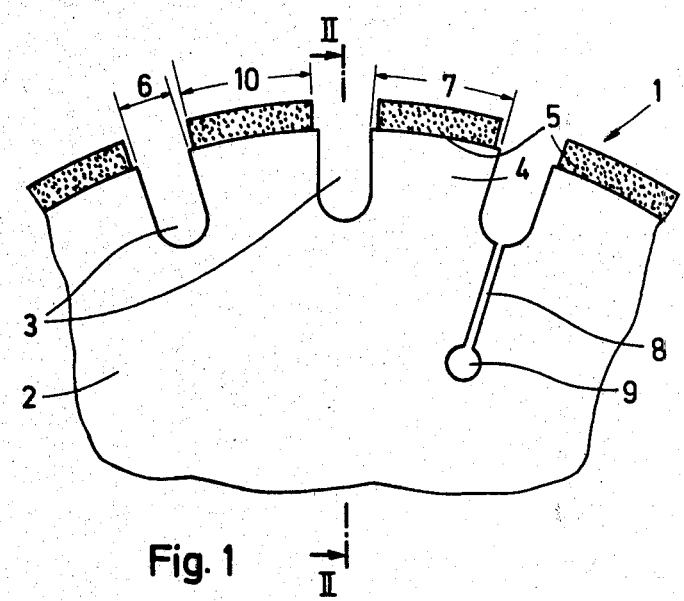

United States Patent [19]

Eichenlaub et al.

[11] 4,345,579
[45] Aug. 24, 1982

[54] CUTTING WHEEL

[76] Inventors: Rolf Eichenlaub, Quellenweg 26, D-5900 Siegen-Volnsberg; Boris Z. Novakovic, Am Homberg 28, D-5931 Netphen-Frohnhausen, both of Fed. Rep. of Germany

[21] Appl. No.: 183,746

[22] Filed: Sep. 3, 1980

[30] Foreign Application Priority Data

Jun. 27, 1980 [DE] Fed. Rep. of Germany ... 8017100[U]

[51] Int. Cl.³ ............................................... B28D 1/04
[52] U.S. Cl. .................................... 125/15; 51/206 R
[58] Field of Search ......................... 125/15; 51/206 R

[56] References Cited

U.S. PATENT DOCUMENTS 3,203,140  8/1965  Hallez ..................................... 125/15
3,338,230  8/1967  Lindblad ................................ 125/15
4,267,814  5/1981  Benson ................................... 125/15

Primary Examiner—Harold D. Whitehead
Attorney, Agent, or Firm—Young & Thompson

[57] ABSTRACT

A cutting disk or wheel, particularly for the dry cutting of natural and artificial stone material, especially asphalt and concrete, comprises a single-layer saw plate of a high alloy special steel with ribs formed on the circumference by radial separating slots, cutting segments of a diamond material being attached to the webs. Radial cooling and thermal expansion equalizing slots, narrower than the first-mentioned slots, are arranged equidistantly on the wheel circumference and terminate radially inwardly in enlarged cooling bores. Preferably, the latter slots are radially inwardly extending extensions of the former slots. The ratio of the width of the first-mentioned slots to the web length measured peripherally of the wheel, is in the range of 0.5 to 0.7. The ratio of the peripheral length of the cutting segments to the periphery of the wheel, is in the range of 0.015 to 0.025. In this way, the advantages of dry cutting are achieved without the previous disadvantages due to high wear and unequal thermal expansion and contraction.

5 Claims, 2 Drawing Figures

CUTTING WHEEL

The present application is related to our copending applications Ser. Nos. 102,414, filed Dec. 11, 1979 and 162,208, filed June 23, 1980.

Small-scale work in road construction, such as, for example, cutting out manholes as well as small road repair work are primarily executed by means of high-speed cutting machine saws studded with "Bakelite" bonded fibrous disks having a diameter of 250–400 mm and being driven by a gasoline engine. The sawing operations are performed under dry conditions with a peripheral speed of the cutting wheel of about 80 m/sec. The dust produced during the sawing work is suctioned off via special protective hoods.

The essential disadvantage of the "Bakelite" disks is to be seen in their brief lifetime due to great wear and tear.

As of today, the breaking up of concrete, reinforced concrete, and masonry walls, the cutting out of doors and walls, the cutting up of factory floors or ceilings with exact, clean, and straight edges for the laying of new conduits, etc. is performed by means of saws that operate exclusively by the wet cutting method.

The essential disadvantage in the wet cutting method is the free outflow of cooling water, which can lead to grave damage when working in closed rooms.

Attempts at using dry-cutting saw wheels of steel with diamond cutting sgements have not led to a useful result. Due to the great evolution of heat in the saw plate and/or the core disk of steel, thermal stresses and thermal expansions occur in the wheel, causing deformations and cracks especially in the circumferential zone so that the cutting wheel becomes unstable in operation after only a short operating period and thus a perfect cut is no longer possible. The danger of crack formation is also present, particularly in the case of non-uniform cooling after an unduly high heating up of the saw plate, during the shrinking of the saw plate material. Besides, the solder between the diamond cutting segments and the mounting webs on the circumference of the saw plate is weakened on account of the extensive heating of the saw plate, so that there is the danger that the diamond cutting segments may become detached even at low cutting speeds and be flung away from the wheel endangering the working personnel.

The present invention has as its object the provision of a dry cutting saw wheel for the working of natural and artificial stone material for cutting saws, which cutting wheel, due to satisfactory internal cooling and its special constructional design, is not subject to thermal expansion and crack formation during operation and is distinguished from the conventional cutting wheels for the dry cutting of stone material by a substantially longer operating life due to an increased resistance to wear and tear.

The object has been achieved according to the present invention by providing a cutting wheel for cutting saws, fashioned as a dry cutting wheel, this cutting wheel comprising a one-layer saw plate of a high-alloy special steel with webs formed along the circumference by radial separating slots, cutting segments of a diamond material being attached to these webs, and furthermore comprising additional, radial cooling and thermal-expansion-equalizing slots arranged at equal spacings along the wheel circumference with a cooling bore at the radially inner end thereof.

In a further, advantageous embodiment of the invention, the expansion-equalizing slots are arranged in the extension of the separating slots in the circumferential zone of the saw plate.

The invention furthermore provides that the separating slots are fashioned as broad cooling slots, and that the ratio of the separating slot width to the web length is in a range of between 0.5 and 0.7.

A substantial feature of the invention resides, finally, also in the short cutter length of the cutting segments as compared to the circumference of the wheel, wherein the ratio of the cutter length to the wheel circumference is in a range of between 0.015 and 0.025.

Due to the construction of the dry cutting saw wheel according to this invention as a single-layer saw plate with radial slots equidistantly spaced along the wheel circumference for the equalization of thermal expansion, in addition to the separating slots constituting the mounting webs for the cutting segments, any thermal expansion occurring under certain circumstances in the circumferential zone of the saw plate can be equalized so that deformation of the saw plate and crack formation during heating and cooling are avoided and a stable operation of the cutting wheel is attained, ensuring a perfect cut. The intensive cooling by the broad separating slots, acting as cooling slots, between the mounting webs for the cutting segments, and the thermal-expansion-equalizing slots prevents an undue heating of the cutting wheel even when exerting high cutting forces. Furthermore, on account of the short cutting segments having a short cutter length as compared to the wheel circumference, the heat-transfer area of the thermal contact bridges constituted by the cutting segments between the material to be worked and the saw plate is reduced and, in this way, evolution of heat in the cutting wheel is diminished. The construction of the novel dry cutting saw wheel as a single-layer wheel of steel with cutting segments of a diamond material as well as cooling and thermal-expansion-equalizing slots in the circumferential zone of the saw plate, reducing the thermal stress on the wheel to a minimum, ensures a substantially longer operating life and a considerably higher cutting speed of the novel wheel as compared with the conventional dry cutting saw wheels.

Figure 2:
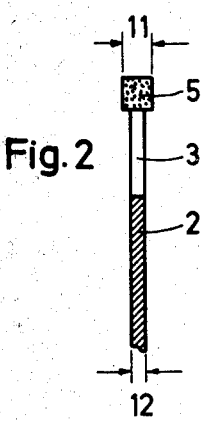

The invention will be described in detail below with reference to an embodiment illustrated in the drawing wherein:

FIG. 1 shows a fragmentary lateral view of the cutting wheel according to this invention and FIG. 2 shows a partial cross section of the separating wheel along line II—II in FIG. 1.

The cutting wheel 1 according to FIGS. 1 and 2 for small, high-speed cutting saws utilized primarily in road construction for the dry cutting of asphalt and concrete comprises a single-layer saw plate 2 of a high-alloy steel. Mounting webs or bases 4 are formed along the circumference of the saw plate 2 by and between radially arranged separating slots 3. Cutting segments 5 having the shape of an annular segment and sintered from a metallic powder comprising a tungsten-cobalt base with an addition of particulate diamond, are hard-soldered with silver solder to these mounting webs.

The separating slots 3 are fashioned as broad cooling slots, wherein the ratio of separating slot width 6 to web length 7 is in the range of 0.5 and 0.7. The separating slots 3 between the mounting webs 4 furthermore serve for the equalizing of any thermal stresses occurring in the circumferential zone of the saw plate 2, caused by the frictional heat produced during the dry cutting step.

Along the circumference of the saw plate 2, four or six radial cooling and thermal-expansion-equalizing slots 8 are additionally provided, depending on the plate diameter, at mutually equal spacings, including a cooling bore 9 located at the base of the slot. These slots lie in an extension of the separating slots 3.

The cutting segments 5 exhibit a short cutter length 10 as compared to the wheel circumference, wherein the ratio of the cutter length 10 to the wheel circumference is in the range of 0.015 to 0.025. Due to the short cutter length, the heat-transfer area of the thermal contact bridges formed by the cutting segments 5 between the material to be worked and the saw plate 2 is kept small and, in this way, a deleterious heat development in the circumferential zone of the saw plate 2 is avoided. The cutter thickness 11 of the cutting segments 5 is greater than the thickness 12 of the saw plate 2, so that the cutting segments 5 overlap bilaterally with respect to the saw plate.

By virtue of the cooperation of the separating slots 3 with the cooling and thermal-expansion-equalizing slots 6 equipped with cooling bores 9, a deleterious heating of the cutting wheel on account of the high frictional heat is avoided by intensive cooling even at great cutting forces during the dry cutting of asphalt and concrete, and any thermal expansion which may occur during a short-term overload in the circumferential area of the wheel is equalized. Consequently, no deformation can occur at the saw plate, and thus a perfect cut is ensured, with a resultant long operating life of the cutting wheel.

What is claimed is:

1. In a cutting disk comprising a steel support disk having radially extending slots spaced about its periphery, the slots defining between them bases, and cutting segments of abrasive material mounted on said bases; the improvement in which the disk is a dry cutting disk, and thermal expansion equalizing slots spaced equidistantly about the disk circumference and extending radially inwardly further than the first-mentioned slots and being narrower than said first-mentioned slots, the last-mentioned slots being arranged as radially inward extensions of the first-mentioned slots.

2. A cutting disk as claimed in claim 1, and cooling bores at the radially inner ends of said thermal expansion equalizing slots.

3. A cutting disk as claimed in claim 2, in which the last-mentioned slots are arranged as radially inward extensions of the first-mentioned slots.

4. A cutting disk as claimed in claim 1, in which the first-mentioned slots have their width-to-length ratio in the range of 0.5 to 0.7.

5. A cutting disk as claimed in claim 1, in which the ratio of the length of the cutting segments to the disk circumference is in the range of 0.015 to 0.025.

* * * * *